G. J. LEE.
RESILIENT WHEEL.
APPLICATION FILED APR. 4, 1914.
1,152,648.
Patented Sept. 7, 1915.
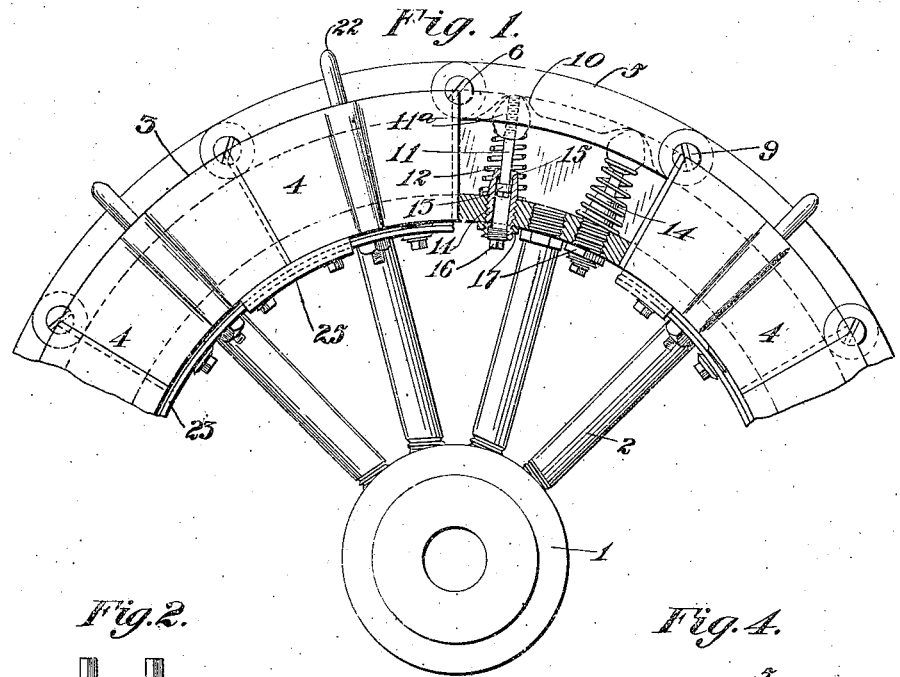
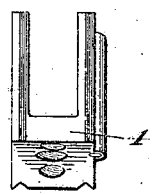
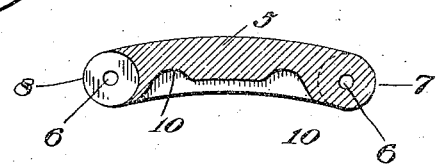
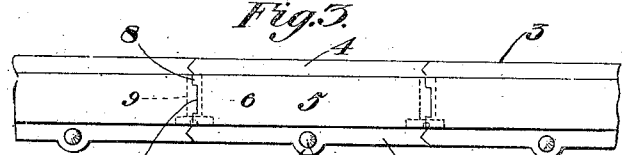
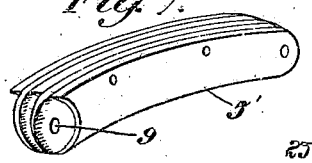
Attest:
Ewd L Tolson
Arthur Middleton
Inventor:
Guavara J. Lee.
by Spear Middleton Donaldson Spear
Attys.

UNITED STATES PATENT OFFICE.

GUAVARA J. LEE, OF GORMAN, MARYLAND.

RESILIENT WHEEL.

1,152,648.

Specification of Letters Patent.   Patented Sept. 7, 1915.

Application filed April 4, 1914.   Serial No. 829,628.

*To all whom it may concern:*

Be it known that I, GUAVARA J. LEE, a citizen of the United States, residing at Gorman, Maryland, have invented certain new and useful Improvements in Resilient Wheels, of which the following is a specification.

This invention relates to resilient vehicle wheels of the non-pneumatic type and has for its object to provide a vehicle wheel that has all the advantages of a pneumatic wheel without its disadvantages.

With these and other objects in view, the invention consists in the construction and arrangement and combination of parts hereinafter described and particularly pointed out in the claim, it being understood that I do not wish to limit myself to the details of the different parts of my invention.

The invention is illustrated in the accompanying drawings, in which:—

Figure 1 is a portion of a side elevation of a resilient vehicle wheel embodying my invention, with parts in section. Fig. 2 is a transverse view of one of the felly sections. Fig. 3 is a plan view of a portion of the wheel. Fig. 4 is a longitudinal section of one of the tread links or sections. Fig. 5 is a view of a modified form of tread section, and Fig. 6 is a fragmental plan view of the telescopic connection between two of the sections of the retracting band. Fig. 7 is a perspective view of a modified form of link.

In the drawings the ordinal 1 indicates the hub of the wheel, 2 the spokes, and 3 a sectional rim supported by the spokes. This rim is made up of felly sections 4. I prefer to have the felly divided into 12 sections under ordinary circumstances. These sections are substantially U-shaped in cross section, as shown in Fig. 2. The rim or tread of the wheel is made up of sections 5, pivoted or hinged to each other as at 6. The tread sections are equal in number to the felly sections 4, and the pivots of the rim sections are in line with the adjacent edges of the felly sections. The tread sections are, of course, of arc shape, as shown in Fig. 4, and are provided at one end with a tongue 7 and at the other with a groove 8. While in Figs. 3 and 4 the tread members are shown made in one piece, I may make these of laminations or form a plurality of stamped out strips 5' which modification is shown in Fig. 7. The tongues 7 fit neatly into the grooves 8 when the sections are in place on the wheel; they present an unbroken periphery and the sections are pivoted together by the pins 9. Sockets 10 are provided on the under side of the tread sections for a purpose hereinafter set forth.

The tread sections 5 are spring supported, unattached except to each other, in the U of the felly sections 4 by means of pins 11 having ball or rounded heads 11ª, screwed thereon, adapted to fit into the sockets 10 of the tread sections. These pins are supported from the sectional rim 3 by helical springs 12 surrounding them.

The inner ends of the pins 11 are headed at 13, which are slidably held in thimbles 14, threaded into the sectional rim 3. Stops 15 are in the outer end of the thimbles to act as limits to the outward movement of the pins 11, and plugs or dust caps 16 are in the inner end thereof.

The stops 16 are threaded into the thimbles so that they may be removed in case it should become necessary to withdraw the pins 11, in which event, however, it would first be necessary to unscrew therefrom the ball heads 11ª. The thimbles are further held rigid in the sectional rim 3 by means of lock nuts 17.

In operation the tread sections normally project half their thickness from the felly sections. It is obvious how an obstruction or unevenness of road would compress the tread sections into the U of the felly sections by means of the springs 12, and the pins 11 sliding in the thimbles 14. There are no stops to limit the inward movement of the tread sections, as when they are compressed into the felly sections to be level with the legs thereof, it can be seen how they will be compressed no farther thereinto because the periphery of the tread sections and the felly sections will intersect at the point of bearing of the wheel upon the ground.

The wheel may be provided with anti-skidding means, such as pins 22 and any suitable means may be employed to contract a ring composed of the sections 23 and 25 for controlling the inward or outward movement of said pins.

In the modified form of tread section shown in Fig. 5 I may insert a pad of resilient material, such as rubber instead of having the section made entirely of metal.

I claim as my invention:

In a wheel, a plurality of spokes, a hollow felly made up of sections corresponding in number to the spokes, a rim seated in said felly and composed of a series of links pivoted together, a pair of sockets in each of said links, a pair of sleeves in each of said felly sections, pins slidably held in said sleeves, said pins having heads resting in the sockets, and springs coiled around the pins and engaging the heads and sleeves.

In testimony whereof I affix my signature in presence of two witnesses.

GUAVARA J. LEE.

Witnesses:
WALTER DONALDSON,
BENNETT S. JONES.